United States Patent [19]
Boudreau et al.

[11] Patent Number: 5,933,551
[45] Date of Patent: *Aug. 3, 1999

[54] BIDIRECTIONAL LINK SUBMODULE WITH HOLOGRAPHIC BEAMSPLITTER

[75] Inventors: Robert Addison Boudreau, Hummelstown; Terry Patrick Bowen, Etters, both of Pa.; Michael R. Feldman, Charlotte, N.C.; Hongtao Han, Mechanicsburg, Pa.; Michael Kadar-Kallen, Harrisburg, Pa.; John Robert Rowlette, Sr., Hummelstown, Pa.; Jared David Stack, Harrisburg, Pa.; Robert D. TeKolste; William Hudson Welch, both of Charlotte, N.C.; Randall Brian Wilson, Maplewood, N.J.; Ping Zhou, Middletown, Pa.

[73] Assignees: The Whitaker Corp., Wilmington, Del.; Digital Optics Corp., Charlotte, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/723,197

[22] Filed: Sep. 27, 1996

Related U.S. Application Data

[60] Provisional application No. 60/004,504, Sep. 29, 1995.

[51] Int. Cl.[6] .................................................. G02B 6/36
[52] U.S. Cl. .................................. 385/14; 385/92
[58] Field of Search ........................... 385/14, 24, 88–94

[56] References Cited

U.S. PATENT DOCUMENTS

| | | | |
|---|---|---|---|
| 4,210,923 | 7/1980 | North et al. | 357/30 |
| 4,431,258 | 2/1984 | Fye | 350/1.6 |
| 4,756,590 | 7/1988 | Forrest et al. | 350/96.15 |
| 4,904,036 | 2/1990 | Blonder | 350/96.11 |
| 4,989,935 | 2/1991 | Stein | 350/96.11 |
| 5,101,460 | 3/1992 | Richard | 385/37 |
| 5,127,075 | 6/1992 | Althaus et al. | 385/94 |
| 5,182,782 | 1/1993 | Tabasky et al. | 385/89 |
| 5,202,943 | 4/1993 | Carden et al. | 385/92 |
| 5,337,398 | 8/1994 | Benzoni et al. | 385/90 |
| 5,416,871 | 5/1995 | Takahashi et al. | 385/88 |
| 5,420,953 | 5/1995 | Boudreau et al. | 385/88 |
| 5,479,426 | 12/1995 | Nakanishi et al. | 372/43 |
| 5,500,910 | 3/1996 | Boudreau et al. | 385/24 |
| 5,519,363 | 5/1996 | Boudreau et al. | 333/1 |
| 5,546,489 | 8/1996 | Ssaki et al. | 385/88 |
| 5,574,561 | 11/1996 | Boudreau et al. | 356/399 |

FOREIGN PATENT DOCUMENTS

| | | | |
|---|---|---|---|
| 0 171 615 | 2/1986 | European Pat. Off. | G02B 6/12 |
| 0 216 174 | 4/1987 | European Pat. Off. | G02B 6/34 |
| 0 234 280 | 9/1987 | European Pat. Off. | G02B 6/34 |
| 0 640 853 A1 | 3/1995 | European Pat. Off. | G02B 6/12 |
| WO 96/00920 | 1/1996 | WIPO | G02B 6/42 |

*Primary Examiner*—Hung N. Ngo
*Attorney, Agent, or Firm*—McDermott, Will & Emery

[57] ABSTRACT

An optical bidirectional link comprising: a module having a lower surface and an upper surface. The upper surface having disposed thereon a submodule having an optical transmitter and detector mounted thereon. Circuitry mounted on the upper surface. The circuitry having electronic components for effecting bidirectional communication via the optical transmitter and detector. A cover disposed over the upper surface of the module, wherein the submodule further comprises a silicon substrate having an optical fiber disposed in v-groove, a laser, reflective surfaces, and a holographic plate disposed on an upper surface of the silicon substrate.

11 Claims, 7 Drawing Sheets

Fig. 7

BIDIRECTIONAL LINK SUBMODULE WITH HOLOGRAPHIC BEAMSPLITTER

The application claims benefit of provisional application Ser. No. 60/004,504, filed Sep. 29, 1995.

FIELD OF THE INVENTION

The invention relates to a bi-directional optical link submodule based on silicon waferboard technology.

BACKGROUND OF THE INVENTION

With the advent of communications at optical frequencies, a great effort has been made to provide optical transceiver units that have greater bandwidth capabilities to allow the transmission and reception of audio, digital communication and interactive video signals. Furthermore, because the end user of such modes of communication is in the home or office, there is a requirement that a large number of devices be deliverable that are reliable and yet cost competitive. While the electronics have evolved to achieve the higher data rates and reliability, up until recently the thrust of the product market has focused on bidirectional links that incorporate TO style laser and detector cans. An example of such a device is as disclosed in U.S. Pat. No. 5,127,075 to Althaus, et al, the disclosure of which is specifically incorporated herein by reference. A drawback to a bidirectional link as is disclosed in Althaus, et al. is the required active alignment of the laser/LED and the detector with the focusing and beamsplitting elements in the optical package. This labor intensive alignment results in a bidirectional link that is expensive. Accordingly, passive alignment has become almost required to achieve the cost requirements while maintaining the reliability and data rate requirements.

One technology that has been employed to effect passive alignment between optical components, active devices and fibers is amorphous or monocrystalline silicon selectively etched to provide grooves, pedestals and standoffs to achieve alignment. This technology is known as silicon waferboard technology to the artisan of ordinary skill. There are a variety of alignment techniques using silicon waferboard that have evolved, and are employed in the present invention. To this end, the present invention makes use of etched surfaces in defined orientations, kinematic mounting using microspheres and standoffs or pedestals to effect the passive alignment of the various optical elements.

The first technique employed is the use of defined surfaces and orientations. This allows for the selective etching of grooves and wells for placement of components and reflective surfaces. The etching can be effected on either monocrystalline material where the defined crystalline planes of the material give known orientations for passive alignment or by reactive ion etching of amorphous material to reveal planes in well defined orientations. The former technique is taught for example in U.S. Pat. No. 4,210,923 to North et al., and is specifically incorporated herein by reference. The latter technique is disclosed in U.S. Pat. application Ser. No. 08/251,061 to Boudreau, et al now U.S. Pat. No. 5,519,363.

The second above referenced technique to effect the passive alignment is the use of microspheres mounted in etched wells in the silicon, known as kniematic mounting. This technique allows, among other capabilities, the ability to passively align coplanar substrates, and accordingly is employed in the present invention. Alignment by use of alignment spheres is disclosed in U.S. Pat. application Ser. No. 08/362,625 entitled "Kinematic Mounting of Optical and Optoelectronic Elements on Silicon Waferboard" now U.S. Pat. No. 5,574,561, to Boudreau, et al, the disclosure of which is specifically incorporated herein by reference.

Finally, to properly passively align the active of the submodule, alignment pedestals are employed. These pedestals are generally formed by well known etching techniques, and the techniques and their utility in the alignment of devices is taught in U.S. Pat. No. 5,182,782 to Tabasky et al., the disclosures of which are specifically incorporated herein by reference.

Another technique employed to achieve accurate, passively aligned light focusing is by the use of holographic elements. In particular, holograms are used for directing light in a wavelength selective manner, for example in multiplexing and demultiplexing. Furthermore, the incorporation of holographic optical elements (HOE's) on silicon is a very efficient manufacturing approach. To this end, the fabrication of the holograms on a silicon substrate for wavelength selective direction of the light to and from selected elements of the optical system incorporates the accuracy of the optical elements with the ready fabrication and passively alignment of the elements on a silicon substrate. Holographic elements fabricated on silicon is as disclosed in U.S. Pat. No. 5,420,953 and U.S. Pat. application Ser. No. 08/269,304 to Boudreau, et al. now U.S. Pat. No. 5,500,910 the disclosures of which are specifically incorporated herein by reference.

One particular drawback of bidirectional links up to now, even those using silicon waferboard, has been compactness of the package. For example in the application to Boudreau, et al. above referenced, the separation of wavelengths via the diffractive properties of holograms requires a rather large distance to effect the separated beams. Accordingly, the present invention accomplishes the wavelength isolation in smaller dimensions as compared to conventional wavelength separation techniques by virtue of the use of a dichroic element to achieve the required isolation of the transmit and receive wavelengths. The present invention does achieve the desired precision of beam focus and direction by use of holograms in selected placement.

Accordingly, what is needed is a passively aligned bidirectional link that isolates the transmit and receive wavelengths from one another, and achieves reliable optical signal transmission in compact physical dimensions.

SUMMARY OF THE INVENTION

The present invention is a bidirectional link that features separate minimization of electrical and optical crosstalk. The link has passively aligned bidirectional optics and devices mounted on a silicon substrate having selectively etched grooves to effect the alignment of an optical fiber to the optical elements of the link, as well as to effect mounting of the optoelectronic devices in proper optical alignment.

The bidirectional link uses a first wavelength for the transmission mode and a second wavelength for the reception mode to minimize optical crosstalk between the reception and transmission signals which would result in signal distortion. Accordingly, the use of wavelength dependent elements such as holograms and dichroic materials is required. To achieve this result in a relatively small volume of space, a holographic plate is disposed above the silicon waferboard having holograms and a dichroic element fabricated thereon. The holograms effect the wavelength selective directing of the transmit and receive modes to and from the respective elements as well as the necessary focusing. The dichroic element provides wavelength dependent filtering for the detector.

Finally, this substrate is then mounted on a module that has the required electronic circuitry to achieve optical transception. The module has a novel cover made of preferably metal or having metal coatings to isolate the drive and receive electronics to minimize electrical cross-talk.

OBJECTS, FEATURES AND ADVANTAGES OF THE INVENTION

It is an object of the present invention to have a passively aligned bidirectional link using silicon waferboard technology.

It is a further object of the present invention that the focusing and wavelength separation of the transmit and receive signals of the bidirectional link is achieved in smaller physical dimensions than is required in conventional wavelength separation techniques.

It is a feature of the present invention to have a silicon substrate selectively etched having grooves for the optical fiber, a reflective surface and passive alignment wells and a holographic plate mounted on top of the substrate having selectively fabricated holograms disposed thereon.

It is a further feature of the invention that the holographic plate incorporates a buried dichroic element to effect optical isolation of the separate transmit and receive optical wavelengths to minimize optical crosstalk.

It is a further feature of the invention that the holographic plate and the substrate are aligned by microspheres mounted in the passive alignment wells.

It is a further feature of the invention that optoelectronic devices are passively aligned by pedestals etched in the substrate and the holographic plate.

It is a further feature of the present invention that the fiber, the reflective surface, the holograms and the optoelectronic devices are aligned through the selective etching of the substrate and the holographic plate.

It is a further feature of the invention that the driver and receiver electronics are enclosed in separate chambers to minimize crosstalk.

It is an advantage of the present invention that the required alignment of the elements of the link is effected at a reduced cost over the conventional links.

DETAILED DESCRIPTION OF THE PREFERRED EMBODIMENTS

Figure 1:
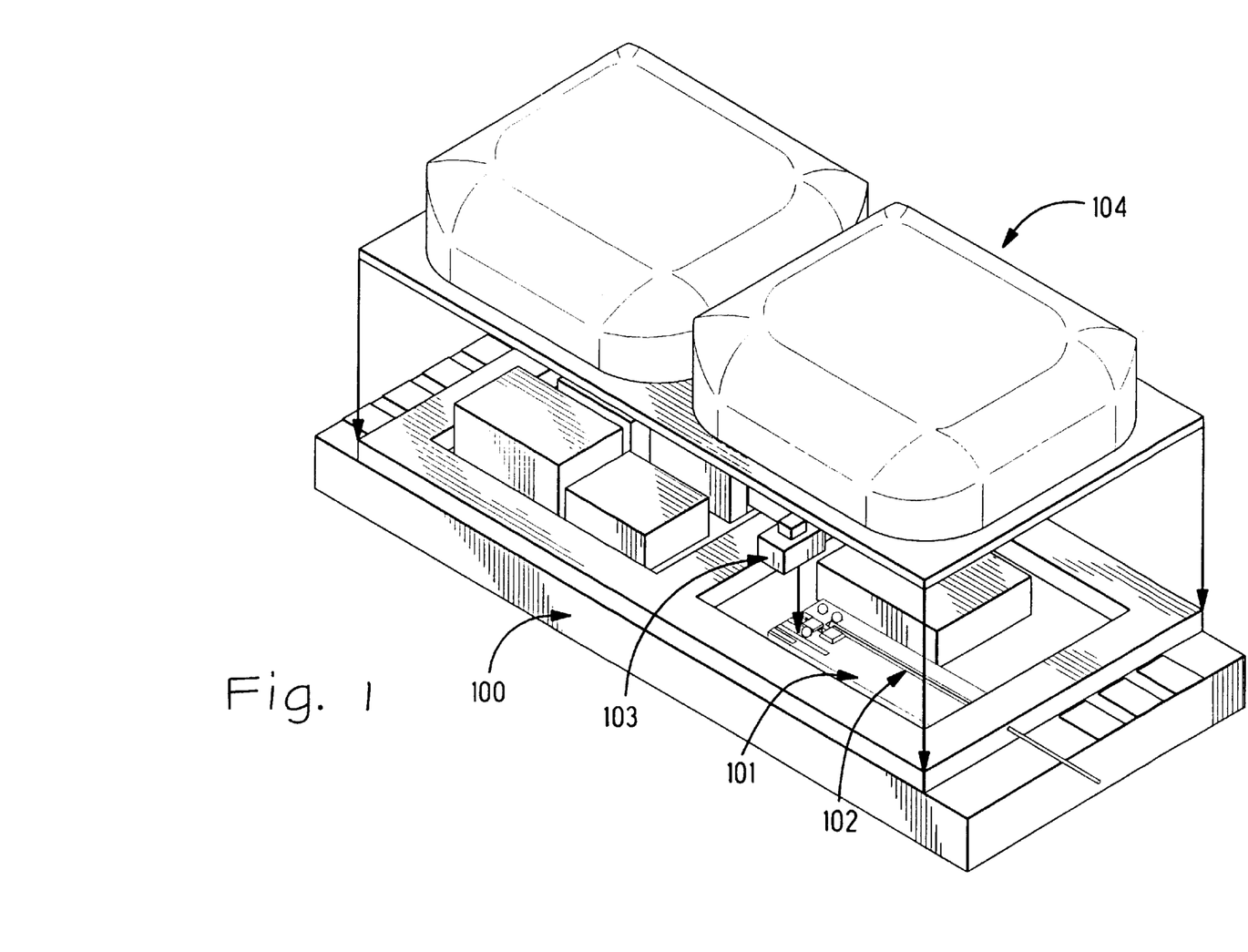
FIG. 1 is an overall view of the bidirectional link of the present invention.

FIG. 1 shows the overall bidirectional transceiver having a cover 104 member that separates the transmit and receive electronics from each other. The cover also provides a hermetic seal between the cover and the multi-chip module 100 by using solder, glass or ceramic as the sealing material. Finally, for purposes of discussion, the transceiver having the circuitry and the silicon chicklet is known as an hybrid integrated optical multi-chip module (MCM) 100. Mounted on the MCM is the silicon chicklet 101 having an optical fiber 102 mounted in a v-groove as well as the integrated holographic optical element (HOE) plate 103.

Figure 2:
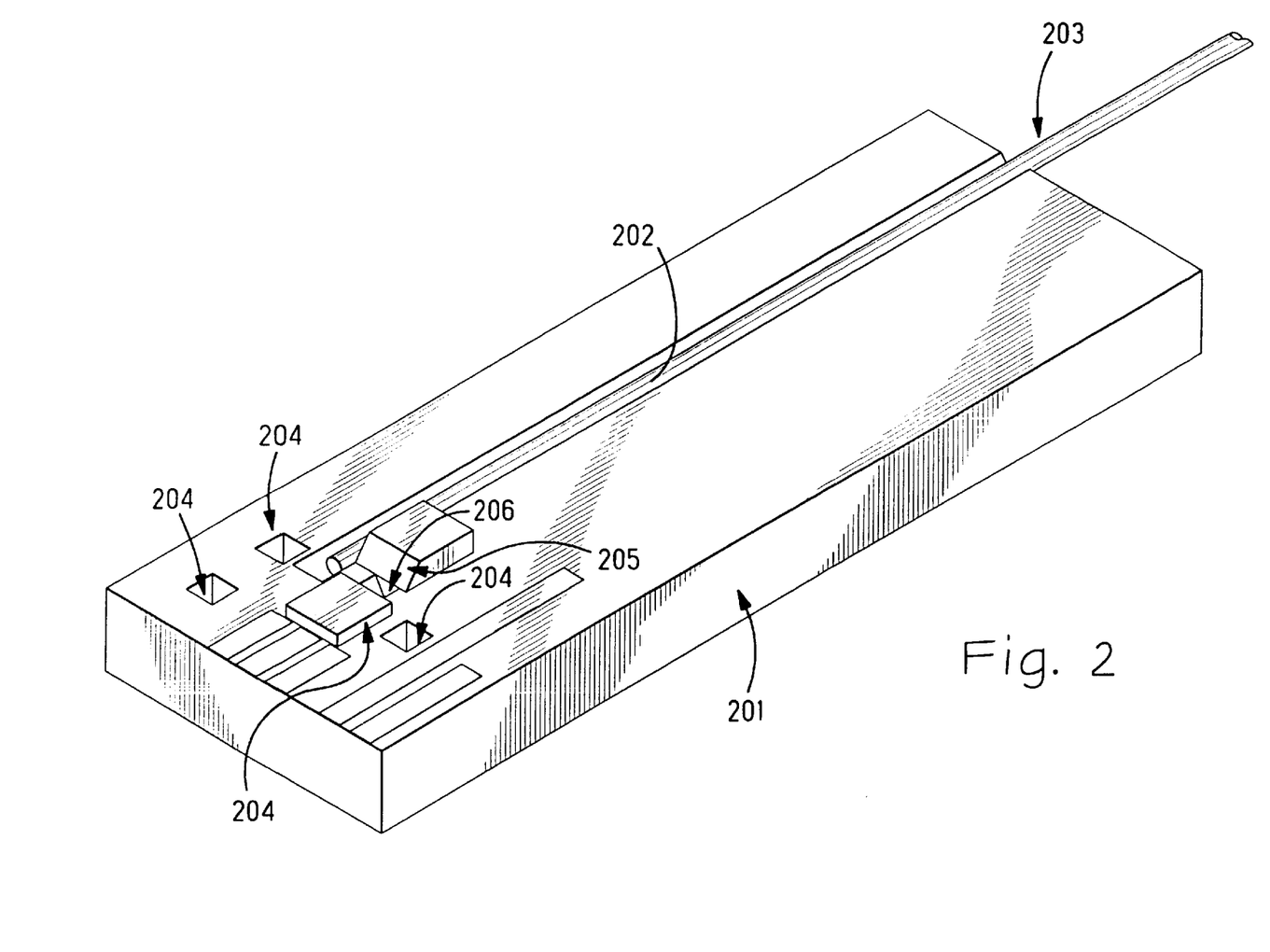
FIG. 2 is an overall view of the silicon waferboard chicklet that forms the submodule of the present invention.

Turning to FIG. 2, the silicon waferboard chicklet is shown having certain elements missing to ease in explanation at this point. The chicklet 201 has a v-groove 202 for reception of the optical fiber 203, as well as passive alignment wells 204 etched by standard technique. To this end, assuming the substrate of the chicklet has a top surface 203 in the (100) plane, the etched surfaces of the v-groove are well defined in the (111) family of planes. It is the well defined and thus predictable orientation and readily determined dimensions of the etched surfaces that results in accurate passive alignment of the elements of the chicklet. A complete understanding of the etching of monocrystalline silicon can be found in U.S. Pat. No. 4,210,923 to North, et al. Furthermore, reactive ion etching can be employed on an amorphous substrate to effect the etched surfaces. To this end, a dielectric substrate is made of silica, and the crystallography of the silica is not utilized. Rather, a reactive ion etching process or a wet chemical etch is employed to create the grooves in the silica.

The laser 204 is disposed on top of the silicon substrate 201, and is located using alignment pedestals and standoffs (not shown) that are etched by techniques known to the artisan of ordinary skill. Examples of such standoffs and pedestals are disclosed in U.S. Pat. No. 5,182,782 to Tabasky et al., the disclosure of which is specifically incorporated herein by reference. Finally, the microreflector 205 is disposed on the surface of the substrate and is made separately an then mounted, and is located by butting an end against to selectively placed pedestals that are etched to protrude from the surface of the substrate. This reflector or micromirror is etched silicon having a planar reflective surface in the (111) plane that is the same plane and is a continuation of the planar surface 206. The placement of the micromirror 205 is done so as to provide a large reflective surface for the laser. That is, the surface 206 and the mirror 205 give a large combined reflective surface.

Figure 3:
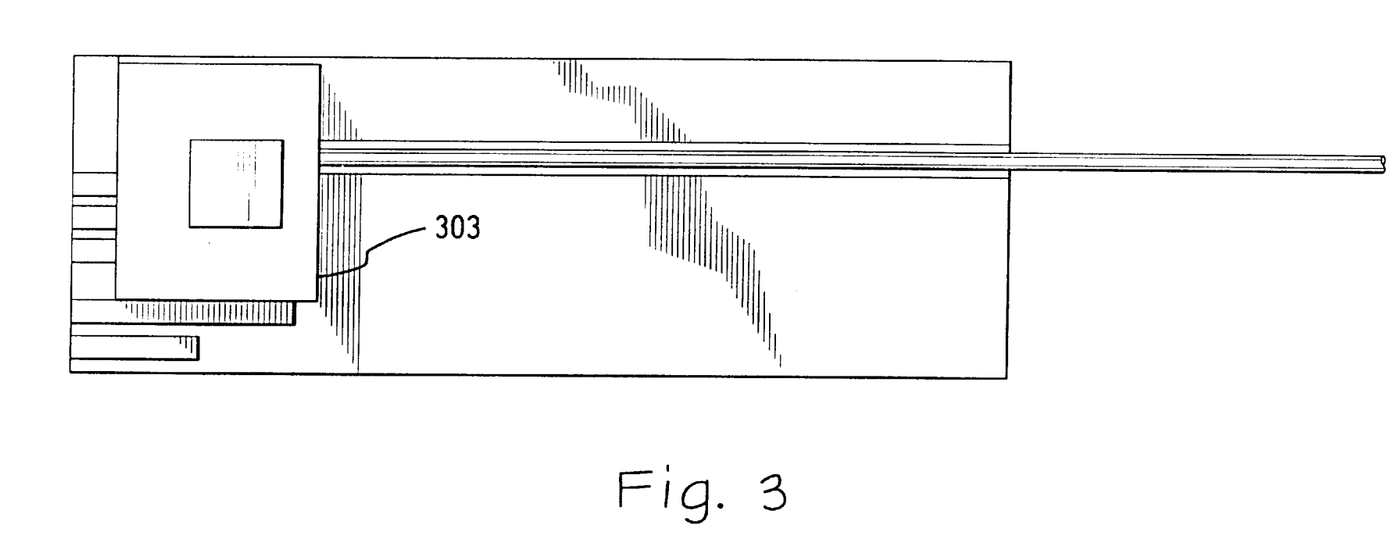
FIG. 3 is a top view of the submodule showing the holographic plate with the detector mounted thereon.
Figure 4:
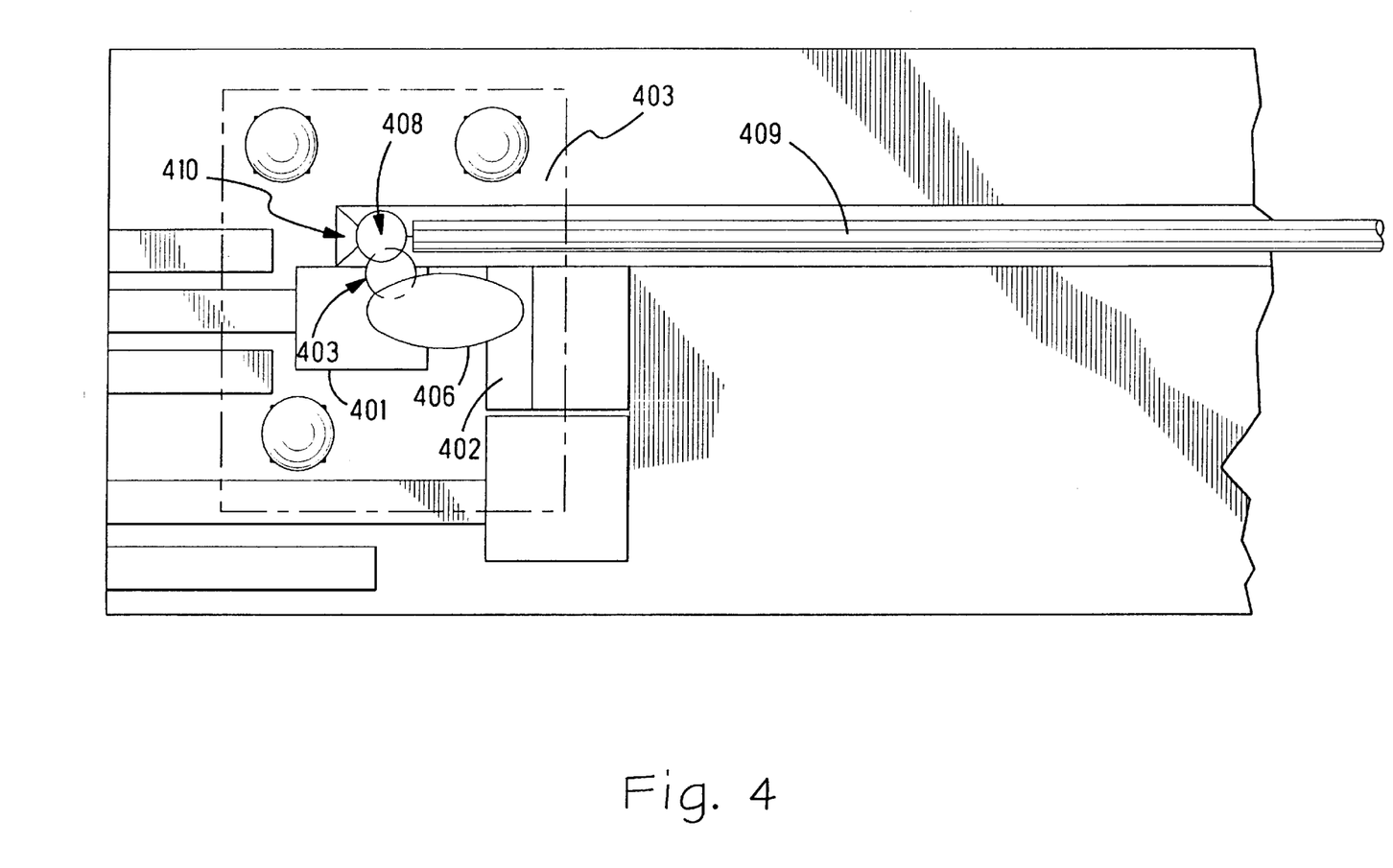
FIG. 4 is a top view of the submodule showing the holograms and kinematic mounting elements of the present invention.

Turning now to FIGS. 3 and 4, we see a top view of the chicklet having disposed thereon the holographic plate 303, 403 mounted on the top surface of the substrate 300,400. The bidirectional link module is preferably fabricated from co-fired ceramic preferably aluminum oxide, aluminum nitride or a glass material. The metal cover may also be Kovar which is then metal coated. The module is fabricated to receive the submodule of the present invention as shown as well as the required communications electronics for the link. The cover serves to achieve electrical isolation between the receive and transmit circuitry as well as to provide a hermetic seal about the module. The hermiticity is effected by fastening the cover to the module with epoxy solder, glass or ceramics. This cover is made preferably of metal, however other materials that will serve to isolate electrical signals will work. The cover is necessary due to the small dimensions of the overall device that is achieved by virtue of the present invention. The holographic plate is made preferably of monocrystalline silicon, however other materials such as glass are possible. The true requirements of the plate is that it be transparent to light of the transmit and receive wavelengths as well as be readily adaptable to having holograms and dichroic elements integrally formed thereon. Furthermore, the photodetector 304 is mounted on top of the holographic plate, and the passive alignment microspheres 405 are shown clearly in FIG. 4.

Figure 5:
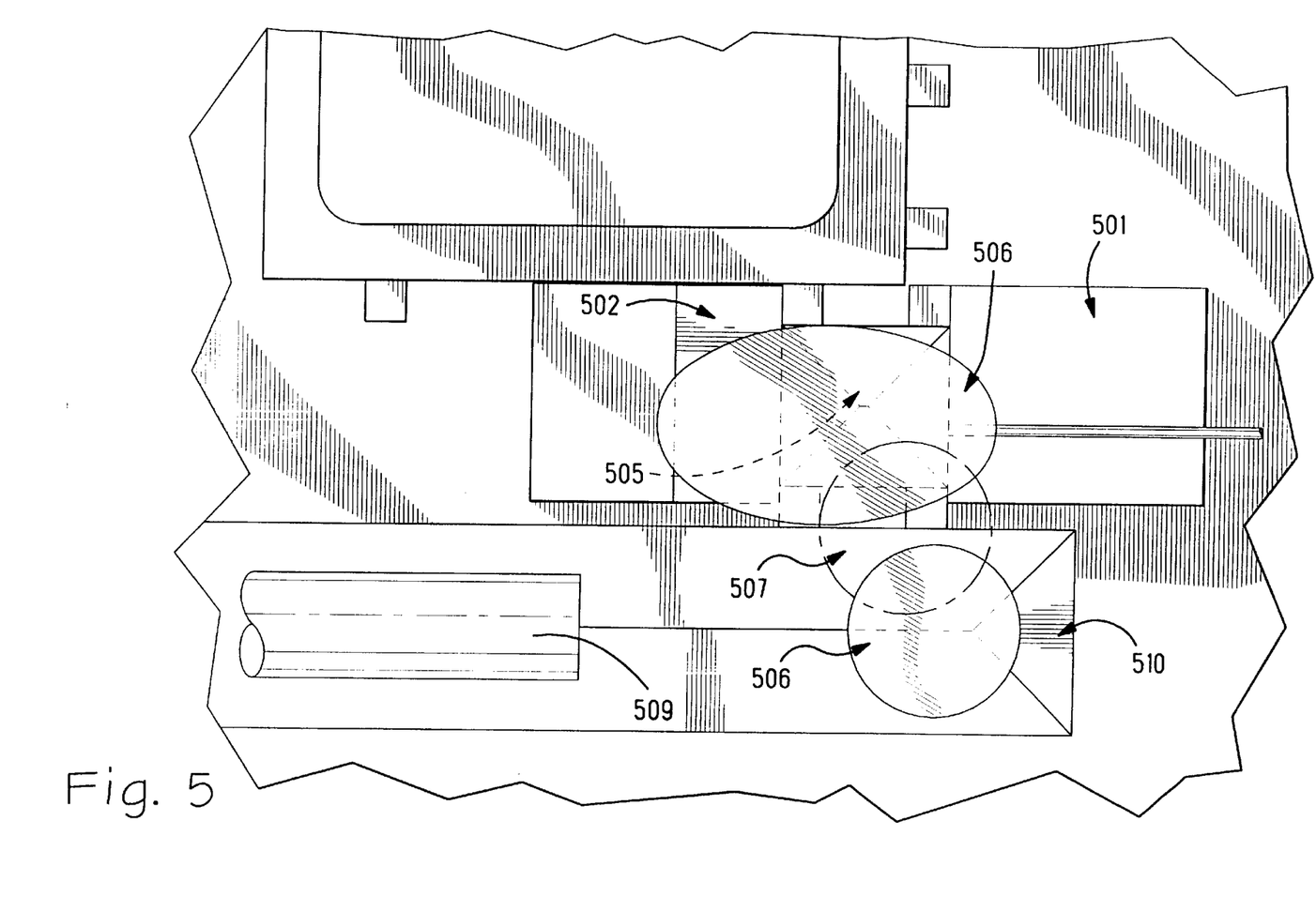
FIG. 5 is an enlarged view of as section of the submodule showing the laser, holograms and reflective surfaces of the present invention.

FIGS. 4 and 5 are top views of the link in pertinent part to the transmission and reception function. For light being transmitted from the laser 401, 501 mounted on the top surface of the silicon substrate, the light emitted is reflected off the micromirror surface 402,502 and etched reflective surface 505 (not shown in FIG. 4). This light is reflected off the hologram 406,506 located on the lower surface of the holographic plate. This elliptical hologram is chosen preferably to be elliptical to match in geometry and shape the cross section of the light emitted from the laser 401,501, and then focus the light in circular cross section in order to most efficiently coupled to the fiber. The light is then focused on the far surface of the plate at a dichroic element (not shown in FIGS. 4 and 5) disposed on the upper surface of the plate and beneath the detector hologram 407, 507. The dichroic element is fabricated to reflect one wavelength (transmit) but pass the other wavelength (receive). The laser light is reflected from the dichroic element to the fiber hologram 408,508 disposed on the lower surface of the holographic plate. This hologram 408,508 focuses light on the reflective surface etched on the silicon substrate, which then directs the light to the fiber 409, 509 via the reflective surface 410,510.

In a receiving mode, light of a second wavelength different from that of the transmission wavelength is effectively coupled to a photodetector disposed on the top surface of the holographic plate. In the reception mode, light from the fiber 409,509 is reflected off the etched reflective surface 410, 510 at the end of the fiber v-groove, is directed upward to the fiber hologram 408,508 located on the lower surface of the holographic plate. This hologram focuses the light on the dichroic element located on the top surface of the holographic plate. The light at the reception wavelength is of a chosen wavelength so that it is transmitted undeflected through the dichroic element to the photodiode. The photodetector hologram 407,507 on top of the holographic plate then focuses the light to a small spot in or on the signal receiving detector disposed on top of the holographic plate. The preferred transmit and receive wavelengths are 1.3 microns and 1.55 microns for telecommunications, however other wavelengths are possible. To effect the system the dichroic and the holograms are tailored for the chosen wavelengths. Finally, a monitor detector 411, 511 is shown. This device is a commonly used tool to monitor the power and wavelength output of the laser 401,501 during operation.

Figure 6:
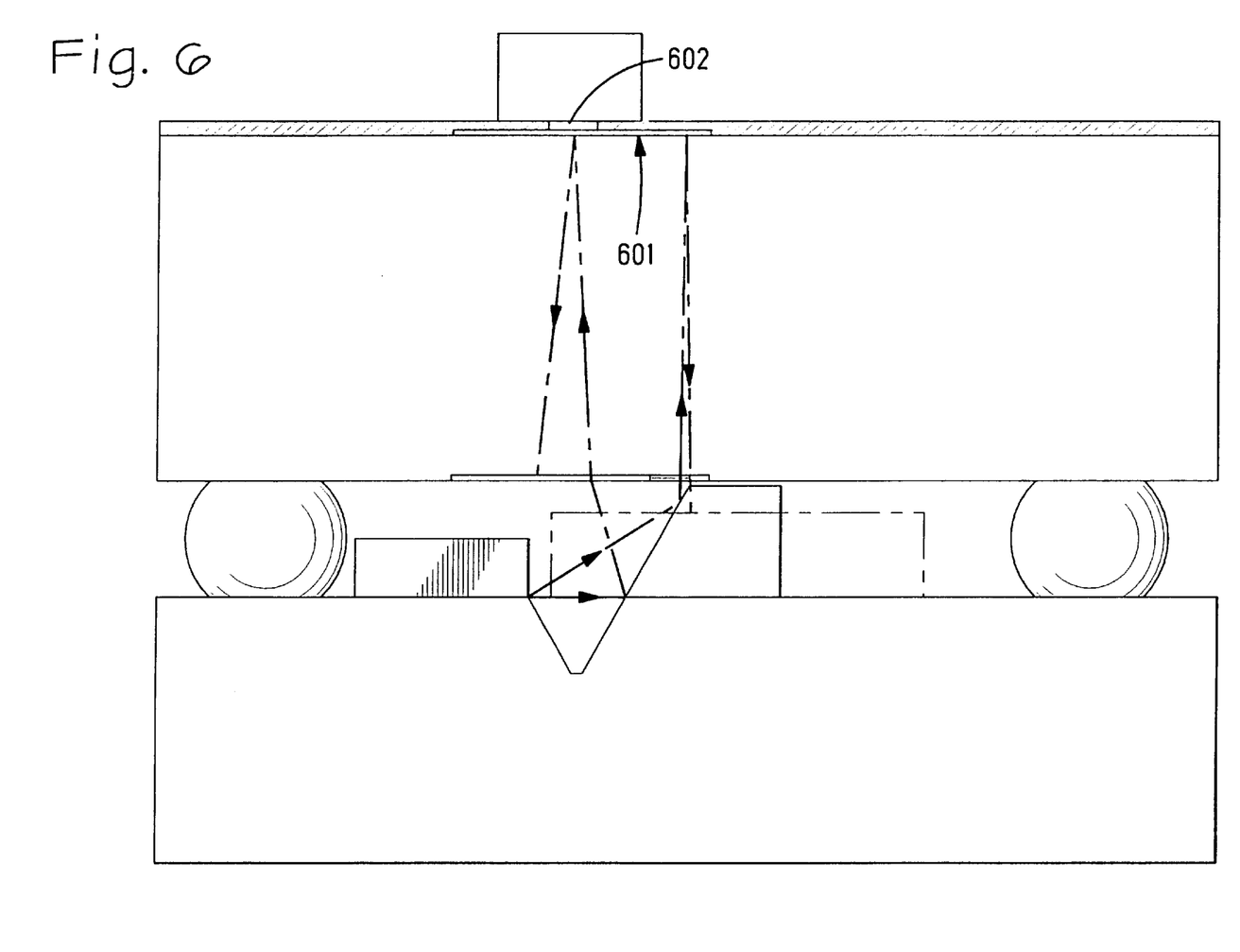
FIG. 6 is a side view of the submodule showing the dichroic element on the holographic plate.
Figure 7:
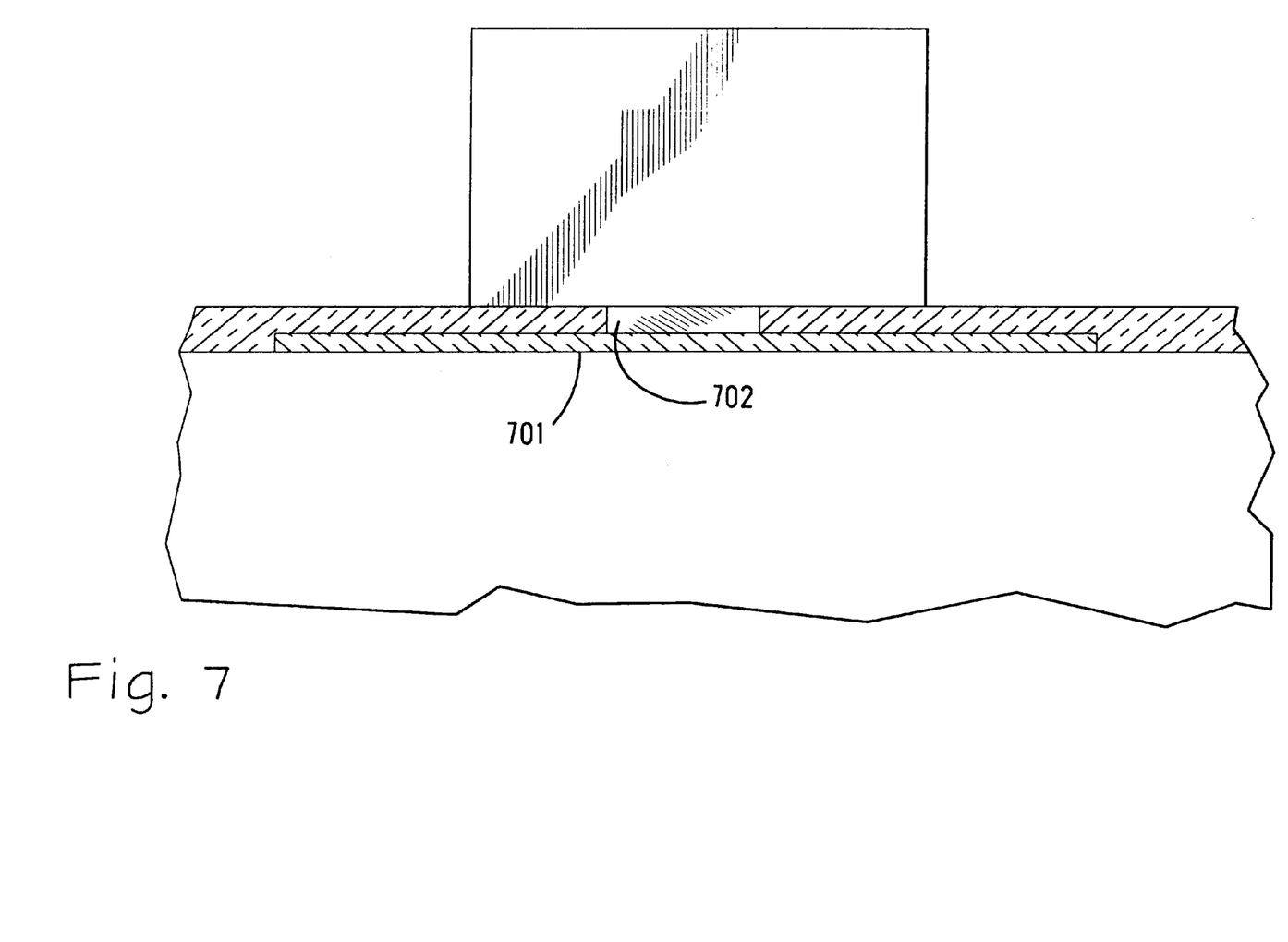
FIG. 7 is a side view of a section of the holographic plate showing the dichroic element and detector HOE.

The light ray paths of the transmit mode are as shown in side view in FIG. 6. The dichroic element is shown at 601 and 701 in FIG. 7. This element and the holograms are fabricated as follows. The holograms of the present are formed on a substrate of silicon by techniques disclosed in U.S. Pat. 5,420,943 above referenced and U.S. Pat. application Ser. No. 08/269,304. The dichroic element 601, 701 is grown on the top surface of the holographic plate by deposition of alternating layers of dielectric, preferably silicon and silicon dioxide. Thereafter, a layer of material 602, 702, preferably glass, is grown. This layer buries the dichroic and serves as the substrate for the fabrication of the detector hologram. To reiterate one of the advantages of the present invention, the dichroic element allows for the isolation of the wavelengths of the transmission and reception modes of the bidirectional link in a very compact area when compared with other methods of wavelength, for example as disclosed in U.S. Pat. application Ser. No. 08/269,304 above referenced. This benefit when coupled with the precise focusing and directing capabilities of the holograms allows for a precise link with good isolation between the transmit and receive modes.

The preferred embodiment having been described, it is understood that modifications of the bidirectional link having elements passively aligned by use of silicon waferboard as well as the integral formation of focusing and light directing elements on a silicon substrate are considered within the purview of the artisan of ordinary skill.

We claim:

1. A submodule for an optical bidirectional link, comprising:
   a substrate having a lower and an upper surface, said substrate having a groove selectively etched on said top surface having an optical fiber therein;
   a first reflective surface at an end of said groove and a second reflective surface disposed on said substrate;
   a laser disposed on said upper surface of said substrate in optical communication with said second reflective surface;
   a holographic plate disposed on top of said substrate, said plate having a lower surface on which is disposed a laser hologram and a fiber hologram, and an upper surface on which is disposed a photodetector, a dichroic element and a photodetector hologram.

2. An submodule as recited in claim 1, wherein said substrate is monocrystalline material and said first reflective surface and said groove have surfaces in well defined crystalline planes.

3. An submodule as recited in claim 1, wherein said second reflective surface further comprises a selectively etched piece of monocrystalline silicon having a reflective face in a defined monocrystalline plane and said upper surface of said substrate has a well etched on said top surface having a wall in the same monocrystalline plane as said reflective face, said reflective face and said wall forming a substantially continuous surface.

4. An submodule as recited in claim 3 wherein said first reflective surface, said reflective face and said wall having a layer of gold deposited thereon.

5. An submodule as recited in claim 1, wherein said fiber hologram, said laser hologram, said photodetector hologram and said dichroic elements are integrally formed on said holographic plate.

6. An submodule as recited in claim 1, wherein said substrate has passive alignment wells selectively located and said wells have microspheres disposed therein for passive alignment of said substrate and said plate.

7. An submodule as recited in claim 1, wherein said laser hologram is substantially elliptical in shape.

8. An optical bidirectional link, comprising:

a module having a lower surface and an upper surface, said upper surface having disposed thereon a submodule having an optical transmitter and detector mounted thereon;

circuitry mounted on said upper surface, said circuitry having electronic components for effecting bidirectional communication via said optical transmitter and detector;

a cover disposed over said upper surface of said module, wherein said submodule further comprises a silicon substrate having an optical fiber disposed in a v-groove, a laser, first and second reflective surfaces and, a holographic plate disposed on an upper surface of said silicon substrate, said plate having a laser hologram and a fiber hologram disposed on a lower surface and a detector hologram, a dichroic beamsplitter and a detector disposed on said upper surface, whereby light is directed and focused by said holograms, said dichroic beamsplitter and said reflective surfaces to and from said fiber.

9. An optical bidirectional link as recited in claim 8, wherein said holograms are fabricated directly on said holographic plate.

10. An optical bidirectional link as recited in claim 8, wherein said v-groove and said first and second reflective surfaces are etched.

11. An optical bidirectional link as recited in claim 8, wherein said silicon substrate is monocrystalline.

* * * * *